(12) United States Patent
Kelly

(10) Patent No.: US 9,995,161 B2
(45) Date of Patent: Jun. 12, 2018

(54) MODULAR TURBOCHARGER CLEARANCE SEAL

(71) Applicant: BorgWarner Inc., Auburn Hills, MI (US)

(72) Inventor: Allan Kelly, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 236 days.

(21) Appl. No.: 14/937,146

(22) Filed: Nov. 10, 2015

(65) Prior Publication Data

US 2016/0130967 A1    May 12, 2016

Related U.S. Application Data

(60) Provisional application No. 62/078,631, filed on Nov. 12, 2014.

(51) Int. Cl.
*F01D 11/00* (2006.01)
*F01D 11/02* (2006.01)
(Continued)

(52) U.S. Cl.
CPC ............ *F01D 11/003* (2013.01); *F01D 11/02* (2013.01); *F02C 6/12* (2013.01); *F02C 7/28* (2013.01);
(Continued)

(58) Field of Classification Search
CPC .......... F01D 11/003; F01D 11/02; F02C 7/28; F02C 6/12; F04D 29/10; F04D 29/102;
(Continued)

(56) References Cited

U.S. PATENT DOCUMENTS 4,865,332 A * 9/1989 Ruetz .................... F01D 11/003
277/347
7,344,362 B2 * 3/2008 Kopp .................... F01D 21/045
417/407
(Continued)

FOREIGN PATENT DOCUMENTS

CN     103032106 A      4/2013
DE      1863430 U     12/1962
(Continued)

OTHER PUBLICATIONS

Chinese Office Action (with English language translation) dated Feb. 2, 2018, in Chinese Application No. 201510771670.8.

*Primary Examiner* — Jason Shanske
*Assistant Examiner* — Christopher R Legendre
(74) *Attorney, Agent, or Firm* — Eric L. Doyle; Stephan A. Pendorf; Patent Central LLC

(57) ABSTRACT

A turbocharger shaft is sealed with respect to the bore of the bearing housing at the turbine wheel end by one or more shaft seal rings. Conventionally these rings are seated in annular grooves provided in the shaft behind the turbine wheel. Problems can arise with this conventional shaft seal arrangement, particularly where the turbocharged engine has an engine brake valve located downstream of the turbine, and the back pressure in the exhaust line, and thus in the turbine wheel housing, can reach 7 bar. The inventive shaft seal design avoids grooves, and makes it possible to assemble a seal with ring seals with higher wear resistance and thus to maintain the seal's effectiveness over heavy use.

9 Claims, 3 Drawing Sheets

(51) Int. Cl.
*F02C 6/12* (2006.01)
*F02C 7/28* (2006.01)
*F04D 29/12* (2006.01)
*F16J 15/447* (2006.01)

(52) U.S. Cl.
CPC .......... *F04D 29/122* (2013.01); *F16J 15/447* (2013.01); *F05D 2220/40* (2013.01)

(58) Field of Classification Search
CPC .... F04D 29/12; F04D 29/122; F05D 2220/40; F16J 15/3272; F16J 15/34; F16J 15/40; F16J 15/44; F16J 15/441; F16J 15/447; F16J 15/4472; F16J 15/46
See application file for complete search history.

(56) References Cited

U.S. PATENT DOCUMENTS

| | | | | |
|---|---|---|---|---|
| 9,169,738 | B2* | 10/2015 | Schlienger | F01D 11/003 |
| 2013/0084161 | A1 | 4/2013 | Groves et al. | |
| 2016/0130967 | A1* | 5/2016 | Kelly | F01D 11/003 |
| | | | | 415/174.5 |
| 2016/0356283 | A1* | 12/2016 | Futae | F02B 39/14 |

FOREIGN PATENT DOCUMENTS

| | | | | |
|---|---|---|---|---|
| DE | 102011117862 | * | 5/2013 | ............ F01D 11/003 |
| JP | 2009228859 A | | 10/2009 | |
| JP | 5071886 B2 | * | 11/2012 | |

* cited by examiner

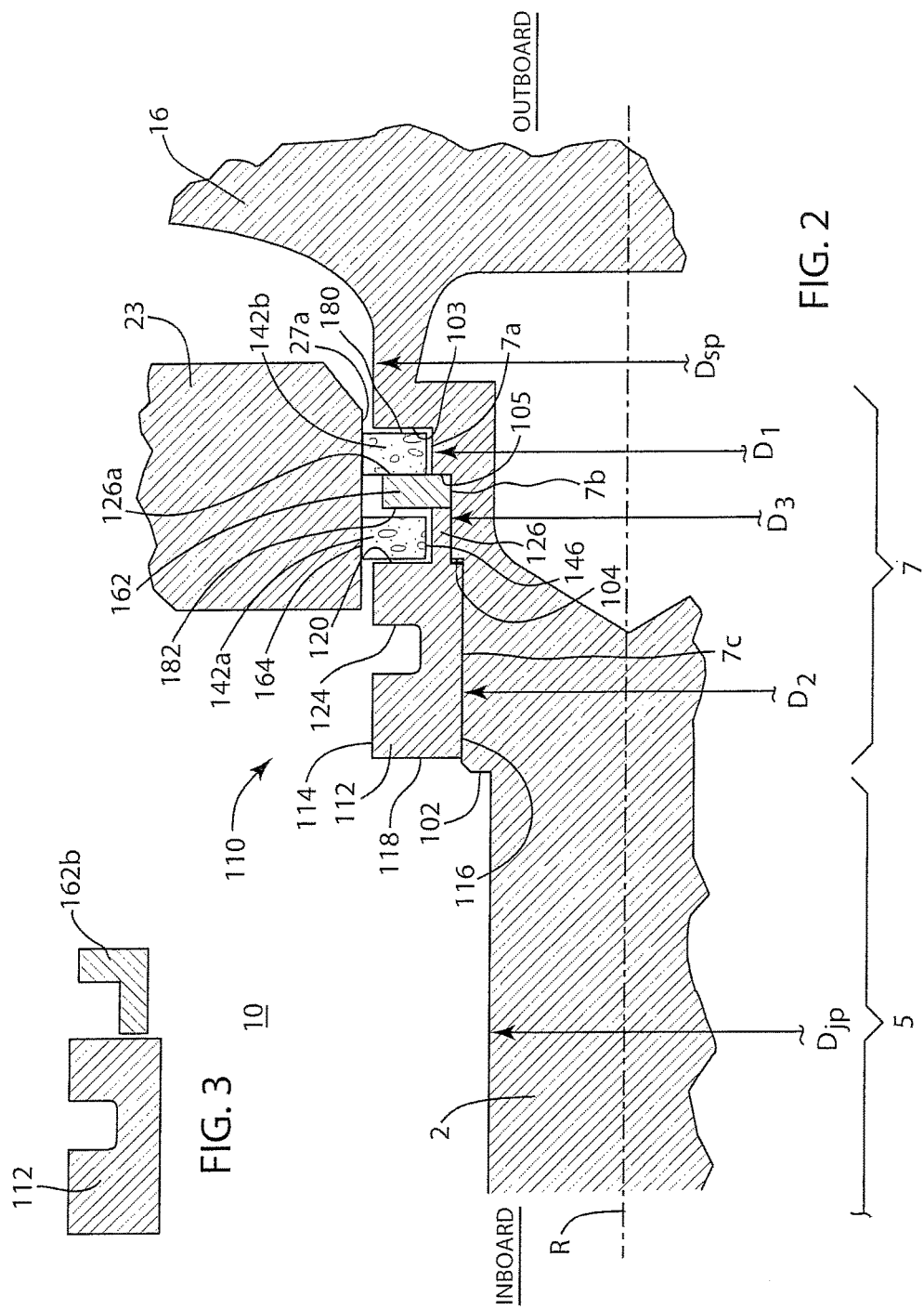

MODULAR TURBOCHARGER CLEARANCE SEAL

CROSS-REFERENCE TO RELATED APPLICATIONS

This application claims the benefit of U.S. Patent Application No. 62/078,631 filed on Nov. 12, 2014, the disclosure of which is herein incorporated by reference in its entirety.

BACKGROUND OF THE INVENTION

Field of the Invention

In a turbocharger the shaft is typically sealed with respect to the bore of the bearing housing at the turbine wheel end by one or more shaft seal rings (or piston rings) which sit in annular grooves provided in the shaft behind the turbine wheel. Problems can arise with this conventional shaft seal arrangement where the turbocharged engine has an engine brake valve located downstream of the turbine. As the engine brake is activated, the back pressure in the exhaust line, and thus in the turbine wheel housing, rapidly rises and can reach 7 bar. The inventive shaft seal design makes it possible to assemble a seal with ring seals with higher wear resistance and thus to maintain the seal's effectiveness over heavy use.

Description of the Related Art

Turbochargers use the exhaust flow from the engine exhaust manifold, which enters the turbine stage of the turbocharger at a turbine housing inlet, to drive a turbine wheel, which is located in the turbine housing. The turbine wheel is affixed to one end of a shaft that is rotatably supported within a bearing housing. The shaft drives a compressor wheel mounted on the other end of the shaft. The turbine wheel, shaft and compressor wheel form a rotating assembly that is supported within the bearing housing. As such, the turbine wheel provides rotational power to drive the compressor of the turbocharger. This compressed air is then provided to the engine intake at a greater density than would be possible in a normal aspirated configuration. This allows more fuel to be combusted, thus boosting the engine's horsepower without significantly increasing engine weight.

When a commercial truck, equipped with an engine compression type exhaust brake, travels down a grade with a long incline, the exhaust brake can be used to block the flow of exhaust gas downstream of the turbine wheel and provide retardation to the vehicle, independent of the vehicle's wheel brakes. The mass and inertia of the truck rolling down the incline forces rotation of the engine through the vehicle gearbox which is driven by the wheels. With no fuel being introduced into the engine, the engine acts like an air pump against the blockage of the exhaust brake, consuming energy and retarding the velocity of the truck.

The turbocharger shaft is typically sealed with respect to the bore of the bearing housing at the turbine wheel end by shaft seal rings (or piston rings) which sit in an annular grooves provided in the shaft behind the turbine wheel (see, e.g., BorgWarner WO2014099289, FIG. 2). The shaft seal prevents oil from the bearing lubrication systems from leaking into the turbine housing which can cause blue smoke and oil drips from the exhaust pipe, as well as preventing exhaust gas pollution of the bearing housing which can cause overheating and adversely effect bearing life.

Problems can arise with this conventional shaft seal arrangement upon activation of the engine brake valve located downstream of the turbine. As the engine brake is activated the back pressure in the exhaust line, and thus in the turbine wheel housing, rapidly rises and can reach 7 bar. As pressure behind the turbine wheel increases, the shaft seal ring(s) can be pushed inboard. This movement, together with the high rotational speed of the shaft, can generate excessive frictional heating which can cause the shaft seal ring to overheat. This in turn can cause the rings to be more susceptible to movement in the bore and induce a rapid failure of the seal.

It is an object of the present invention to overcome the above problem.

SUMMARY

The present invention is made based on the realization that, in the conventional turbocharger, where the shaft is sealed with respect to the bore of the bearing housing by one or more shaft seal rings or ring seals which sit in annular grooves provided in the shaft behind the turbine wheel, the need to expand the rings during installing so that their inner diameter can pass over the areas of greater shaft outer diameter adjacent the groove and then contract the ring for seating of the ring in the groove of the shaft dictates that the rings be made of a malleable or elastic material having high tensile yield strength. Such materials are disadvantageous in that they tend to be compromised in hardness and wear resistance.

The present inventor discovered that by re-designing the shaft and seals to eliminate grooves, such that the ring seals do not have to be expanded and contracted during installing, there is no longer a constraint to selection of sealing rings made of materials with high yield strength. It now becomes possible to select sealing rings made of higher hardness and wear resistance, regardless of yield strength.

As used herein, the term wear resistant refers to materials having a high hardness, such as a hardness of greater than 50 C in a Rockwell test, or a hardness of greater than 85 C when using a smaller HR15N indenter to accommodate smaller parts. In addition, as used herein, a low yield strength refers to a yield strength of less than 500 MPa. In one example, the ring seals are formed of a sintered steel embedded with solid lubricants. In another example, the ring seals are formed of a ceramic material. In yet another example, the ring seals are formed of conventional materials coated to improve wear resistance properties. Although such coatings are known, it has not previously been possible to use them to coat ring seals of conventional turbocharger labyrinth seals since the coatings tend to become cracked or otherwise damaged when the ring seals are stretched open to accommodate the shaft outer diameter while being delivered to their corresponding grooves provided in an outer surface of the shaft. Thus, the modular seal assembly permits a greatly enlarged range of materials that can be used to form the ring seals as compared to some conventional seal assemblies. The grooveless seal assembly advantageously permits assembly of the wear resistant, low yield strength ring seals without an assembly step necessitating deformation thereof.

In accordance with the invention, the turbocharger includes a shaft having at least first and second shoulders delimiting segments of different shaft diameter. The modular seal assembly further comprises at least one retainer and one retainer ring, as well as first and second seal rings. The retainer and retainer ring are separated by a spacer, integrally formed with either the retainer or retainer ring. The retainer and retainer ring when assembled form between them an annular recess adapted to receive the first seal ring. The retainer ring abuts against a first shoulder. Between the first shoulder and a second shoulder is a shaft segment having an outer diameter dimensioned to receive the second seal ring.

As a result of this design, the shaft seal is produced by simply sliding onto the shaft the second shaft seal, the retainer ring until it abuts the second shoulder, the first shaft seal, and the retainer until it abuts the retainer ring. It is not necessary to expand the seal rings to pass over a shaft segment of larger diameter in order to seat the ring in a groove machined into the shaft.

In one embodiment of the invention the outboard and inboard ring seals are dimensioned to interference fit in the bearing housing bore, so that they are static, while the retainer ring and retainer are interference fit or otherwise attached to the rotating shaft. In another embodiment, the retainer ring is interference fit in the bearing housing bore, while the outboard and inboard ring seals are mounted to rotate with the shaft.

BRIEF DESCRIPTION OF THE DRAWINGS

Embodiments are illustrated by way of example and not limitation in the accompanying drawings in which like reference numbers indicate similar parts.

FIG. 2 is an enlarged cross sectional view of the turbine-end of the shaft illustrating a first embodiment of the modular seal assembly.

FIG. 3. is a simplified illustration of a modification of the first embodiment of the invention.

DETAILED DESCRIPTION

Arrangements described herein relate to sealing systems and methods for use between the dynamic rotating assembly components and the complementary static components on the turbine-end of a turbocharger. More particularly, embodiments herein are directed to forming sealing systems that can reduce turbine end blow-by leakage. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

Figure 1:
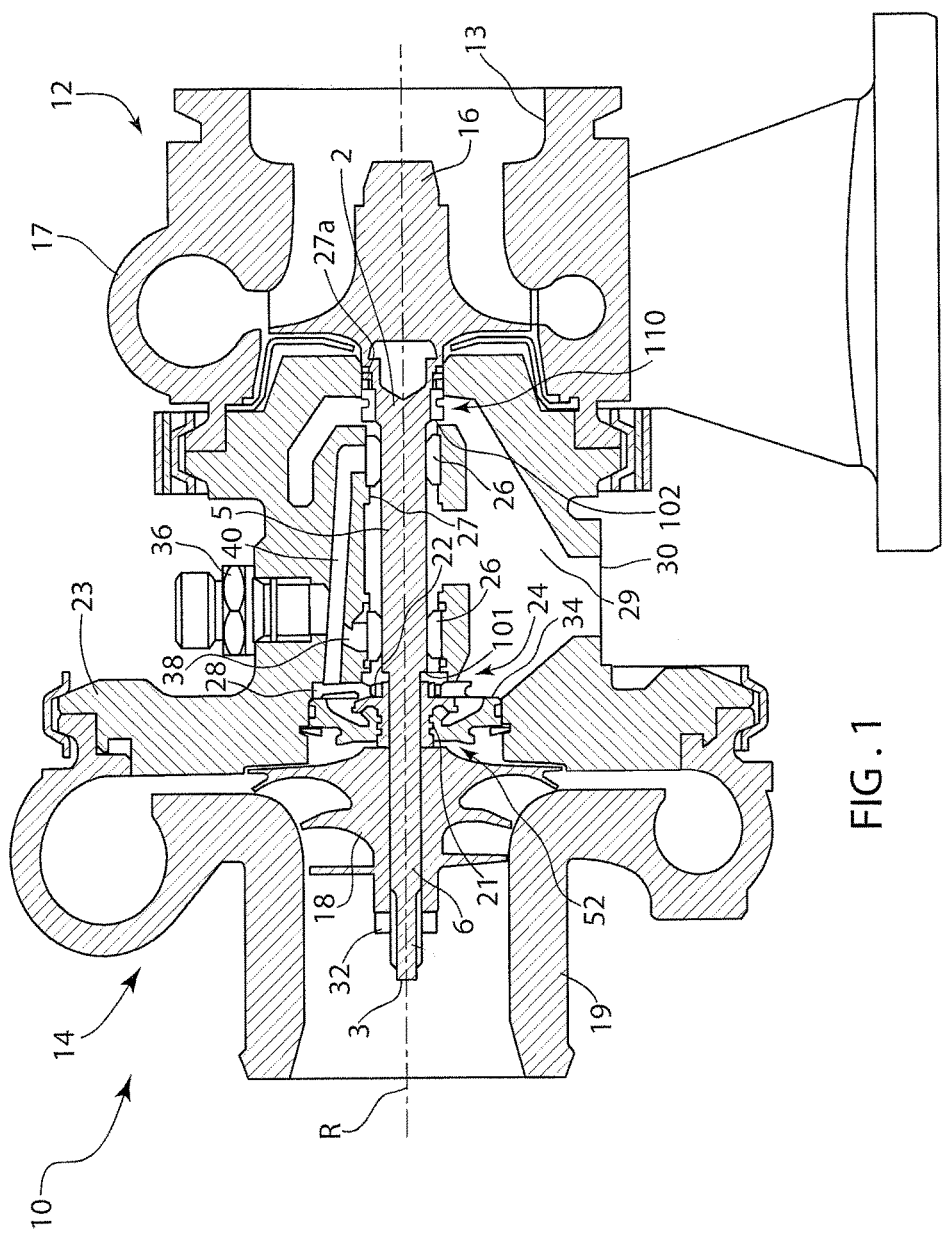
FIG. 1 is a cross-sectional view of an exhaust gas turbocharger including a modular seal assembly at the turbine-end of the shaft.

Referring to FIG. 1, an exhaust gas turbocharger 10 includes a turbine section 12, a compressor section 14, and a center bearing housing 23 disposed between, and connecting, the compressor section 14 to the turbine section 12. The turbine section 12 includes a turbine housing 17 and a turbine wheel 16 disposed in the turbine housing 17. The compressor section 14 includes a compressor housing 19 and a compressor wheel 18 disposed in the compressor housing 19. The turbine wheel 16 is connected to the compressor wheel 18 via a shaft 2.

In the illustrated embodiment, a journaled portion 5 of the shaft 2 is supported for rotation about a rotational axis R within a bore 27 formed in the bearing housing 23 via a pair of axially-spaced radial bearings 26. The axial spacing between the radial bearings 26 is maintained by a cylindrical bearing spacer (not shown). In addition, a thrust bearing assembly 24 is disposed in the bearing housing 23 so as to axially locate the shaft 2. The shaft 2 is reduced in diameter on the compressor side outboard of the compressor-side journal bearing 26 relative to the journaled portion 5, and a shoulder 101 is formed in the shaft 2 at the transition between diameters. The compressor wheel 18 and the thrust bearing assembly 24, including a thrust bearing 28, a thrust washer assembly 22, and an oil flinger, are all located on the shaft 2 in the reduced diameter portion 6, also referred to as the "stub portion" 6. The terminal end 3 of the stub portion of the shaft 2 extends axially beyond the compressor wheel 18 and includes an external thread. A nut 32 engages the thread, and is tightened sufficiently to clamp the compressor wheel 18, the thrust washer assembly 22 and flinger against the shoulder 101. Rather than being clamped into the rotating assembly, the thrust bearing 28 is stationary, and is clamped to the bearing housing 23 by a retaining ring and the insert 34.

In use, the turbocharger 10 uses the exhaust flow from the exhaust manifold of an engine (not shown) to drive the turbine wheel 16. Once the exhaust gas has passed through the turbine wheel 16 and the turbine wheel 16 has extracted energy from the exhaust gas, the exhaust gas exits the turbine housing 17 through the exhaust gas outlet 13 and is ducted to the vehicle downpipe and usually to after-treatment devices such as catalytic converters, particulate traps, and $NO_x$ traps. The energy extracted by the turbine wheel 16 is translated to a rotational motion that is used to drive a compressor wheel 18. As the compressor wheel 18 rotates, it increases the air mass flow rate, airflow density and air pressure delivered to the engine's cylinders via an outflow from the compressor section 14, which is connected to the engine's air intake manifold (not shown).

The turbocharger bearing system is lubricated by oil from the engine. The oil is fed under pressure into the bearing housing 23 via an oil supply port 36 to lubricate the thrust bearing assembly 24 and the shaft bearing surfaces within and about the radial bearings 26. More specifically, oil passes through individual bearing supply channels 38, 40 for lubricating the thrust bearing 28 and the radial bearings 26. Oil is eventually collected within a bearing housing sump chamber 29 for return circulation to the engine crankcase through an outlet port 30.

Referring also to FIG. 2, the shaft 2 includes a conventional compressor-side clearance or labyrinth seal 21 disposed on the between an insert 34 and the flinger to address compressor end blow-by leakage to the space 52 between insert 34 and compressor wheel 18 backwall.

To address turbine end blow-by leakage, a modular seal assembly 110 is disposed between a seal portion 7 of the shaft 20 and a shaft bore portion 27a of the bore 27, described in detail below. The shaft seal portion 7 of the shaft has an enlarged diameter $D_{sp}$ relative to a diameter $D_{jp}$ of the journaled portion 5 of the shaft 20, and a second shoulder 102 is optionally formed in the shaft 2 at the transition between the diameters Dsp and Djp.

The modular seal assembly 110 is configured to effectively minimize or prevent turbine-end blow-by leakage and blow by both at the time of initial installation and over the lifetime of the turbocharger 10. The modular seal assembly 110 is disposed on the seal portion 7 of the shaft 2, and provides a labyrinth seal between the bearing housing shaft bore 27a and the shaft 2. The modular seal assembly 110 includes an outboard ring seal 142b, a retainer ring 162 that is urged against a shaft shoulder 105 to retain the outboard ring seal 142b in a recess between the retainer ring 162 and shaft shoulder 103, an inboard ring seal 142a, and an retainer 112 that, in conjunction with the retainer ring 162, axially retains the inboard ring seal 142a in a recess between retainer 112 and retainer ring 162 formed by a spacer 126. The spacer may be formed as an axial extension of the retainer 112, and spaces the retainer 112 and retainer ring 162 sufficient to allow inboard ring seal 142a to rotate freely with close tolerance.

In the embodiment of the invention shown in FIG. 2, the inboard and outboard ring seals 142a, 142b are dimensioned to interference fit in the bearing housing bore, so that they are static, while the retainer ring and retainer are interference fit or otherwise attached to the rotating shaft. In another embodiment, the retainer ring is interference fit in the bearing housing bore, while the first and second shaft seals are mounted to rotate with the shaft.

In FIG. 2 the retainer 112 is a cylinder with a bore matched to the shaft, having a radially outward-facing surface 114 that faces the ring bore portion 27a, and a radially inward-facing surface 116 that faces an outer surface of the shaft 2. The retainer 112 includes a planar, axially inward-facing surface 118, and an opposed, planar, axially outward facing surface 120. In addition, the retainer 112 optionally includes a circumferentially-extending groove 124 formed in the radially outward-facing surface 114 that serves as an oil flinger. Separation of the retainer 112 from the shaft due to thermal expansion and high rotational speeds is avoided by careful selection of materials used to form the retainer 112.

The retainer ring 162 is annular and has in the illustrated embodiment has a rectangular cross section. The retainer ring 162 has a radially outward-facing edge 164 that faces the bearing housing shaft bore portion 27a, and a radially inward-facing edge 166 that is press fit or shrink fit on an outer surface of the shaft 2 in the embodiment shown in FIG. 2. In addition, the retainer ring 162 includes a planar, axially inboard-facing surface and an opposed, planar, axially outboard facing surface.

The outboard ring seal 142b and the inboard ring seal 142a are substantially similar, and thus common reference numbers will be used to refer to common parts. The outboard ring seal 142b and the inboard ring seal 142a are each annular and have a rectangular cross section. The outboard ring seal 142b and the inboard ring seal 142a each have a radially outward-facing edge 164 that faces the bearing housing shaft bore portion 27a, and a radially inward-facing edge 146 that encircles the shaft 2. In addition, the outboard ring seal 142b and the inboard ring seal 142a each include a planar, axially inboard-facing surface, and an opposed, planar, axially outboard facing surface 180.

The outboard ring seal 142b and the inboard ring seal 142a are formed of a highly wear resistant material. For example, in some embodiments, the surface of the ring seals 142a, 142b may have a surface hardness of Rockwell C 50 and above (or a hardness of greater than 85 C when using a smaller HR15N indenter to accommodate smaller parts) or a Knoop hardness of 1000 and above. In addition, the material used to form the outboard ring seal 142b and the inboard ring seal 142a may have a low yield strength material relative to some conventional ring seals used in turbocharger shaft sealing mechanisms. For example, a conventional ring seal used in this application, such as a ring seal formed of a hardened tool steel such as M2 Tool steel, has a yield strength of 2400 MPa in order to accommodate a ring opening stress of about 2300 MPa. In contrast, the material used to form the outboard ring seal 142b and the inboard ring seal 142a in the present invention may be a highly wear resistant, low yield strength material, such as a ceramic material or a sintered tool steel embedded with solid lubricants. Such highly wear resistant, low yield strength materials may have a yield strength of zero (in the case of some ceramic materials) to about 400 MPa (in the case of some types of lubricant-embedded sintered tool steels). In other embodiments, the material used to form the outboard ring seal 142b and the inboard ring seal 142a may be a conventional material that includes a highly wear resistant coating. Such coatings may include, but are not limited to, titanium or chromium nitride coatings and diamond-like carbon (DLC) coatings. Such alternative materials can be employed to form the ring seals 142a, 142b in the modular seal assembly 110 since, due to the modular nature of the assembly, the ring seals 142a, 142 are assembled without stretching to pass over shaft diameters greater than the ring seal inner diameter before being slid onto the gap on the shaft 2. The modular nature of the seal assembly 110 removes risk of cracking a surface coating during assembly.

The ring seals require a radial gap to allow some tolerance variation as each ring is fit into the bearing housing shaft bore 27a. This is not a problem because the installed stress is low, much lower than the traditional opening stress to assemble, and within the strength of the low wear materials. The installed stress also decreases at operating temperatures because the low-wear materials tend to have very low thermal expansion compared to the bearing housing.

FIG. 3 shows an alternative design of the spacer component of the modular seal assembly. Rather than being formed as a component of the retainer 112, it is formed as a component of the retainer ring 162b. The advantage of this design is that it allows one, two, three, or more retainer rings with spacers to be installed, alternating with ring seals 142a, so that any number of ring seals can be provided on the turbine end of the shaft.

The term "labyrinth seal" as used herein is intended to include the "tortuous path" seal as disclosed in WO2013106303, a "sequential chamber" (sequentially decreasing pressure, with cylincrical shaft of constant diameter) seal as disclosed in U.S. Pat. No. 6,575,693, or a combination of both. The basic idea is that as outboard pressure passes a small outer gap the pressure drops, within the volume in the space between rings there is expansion to again lower the pressure, and as gas passes the next small gap inboard pressure drops further. Small gaps effectively reduce blow-by gas leakage. A labyrinth seal may be composed of many stationary rings and rotating grooves which interdigitate to produce the long characteristic path which slows leakage so that the fluid has to pass through a long and difficult path to escape. For labyrinth seals on a rotating shaft, a very small clearance must exist between the tips of the labyrinth threads and the running surface. Labyrinth seals on rotating shafts provide non-contact sealing action by controlling the passage of fluid through a variety of chambers by centrifugal motion, as well as by the formation of controlled fluid vortices. At higher speeds, centrifugal motion forces the liquid towards the outside and therefore away from any passages. Similarly, if the labyrinth chambers are correctly designed, any liquid that has escaped the main chamber becomes entrapped in a labyrinth chamber, where it is forced into a vortex-like motion. This acts to prevent its escape, and also acts to repel any other fluid. So long as these labyrinth seals are non-contacting as designed, they do not wear out.

Labyrinth sequential chamber seals can also be formed with one cylindrical surface of constant diameter (e.g., rotating shaft) and one surface forming a series of chambers. Leaking fluid is forced through a series of chambers separated by teeth, creating a decrease in both pressure and flowrate.

Referring again to FIG. 2, the seal portion 7 of the shaft 2 includes surface features which accommodate and cooperate with the elements of the modular seal assembly 110 to form an effective labyrinth seal. In particular, the seal portion 7 includes a first reduced diameter portion 7a having a diameter $D_1$ at a location axially spaced apart from the turbine wheel-end 4 of the shaft 2, whereby a third shoulder 103 is formed in the shaft 2 at the transition between the diameters $D_{sp}$ and $D_1$. The first reduced diameter portion 7a has an axial length that corresponds to the axial dimension of ring seal 142b. When assembled, the retainer ring 162 is disposed in the step with reduced diameter $D_3$ and is urged against shoulder 105. The radially inward-facing surface of the retainer ring 162 may be dimensioned to provide a press fit, a slip fit or a rotational fit with respect to the shaft step 7b.

When the pressure in the turbine housing is greater than the pressure in the bearing housing, and in particular when an engine brake valve located downstream of the turbine is activated, and the back pressure in the exhaust line, and thus in the turbine wheel housing, rapidly rises and can reach 7 bar, the outboard ring seal may be urged axially inboard, against outboard surface 126a of retaining ring 162. In this condition the present invention provides a significant advance over the state of the art, since the friction of the two high speed rubbing surfaces is reduced by the provision of an anti-friction component or coating on the ring seal, or mitigated by the use of a highly wear resistant material for the ring seal.

Retainer ring is held in place against shaft shoulder 105 by spacer 126 extending from retainer 112. The retainer and retainer ring when assembled form between them an annular recess adapted to receive the first seal ring.

As a result of this design, the shaft seal arrangement is produced by simply sliding onto the shaft the outboard shaft seal, the retainer ring until it abuts the second shoulder, the inboard shaft seal, and the retainer until it abuts the retainer ring. It is not necessary to expand the seal rings to pass over a shaft segment of larger diameter in order to seat the ring in a groove machined into the shaft.

In the embodiment shown in FIG. 2 the outboard and inboard ring seals are dimensioned to interference fit in the bearing housing bore, so that they are static, while the retainer ring 162 and retainer 112 are interference fit or otherwise attached to the rotating shaft. In the embodiment shown in FIG. 4, the retainer ring 162 is interference fit in the bearing housing bore, while the outboard and inboard ring seals are mounted to rotate with the shaft.

Figure 4:
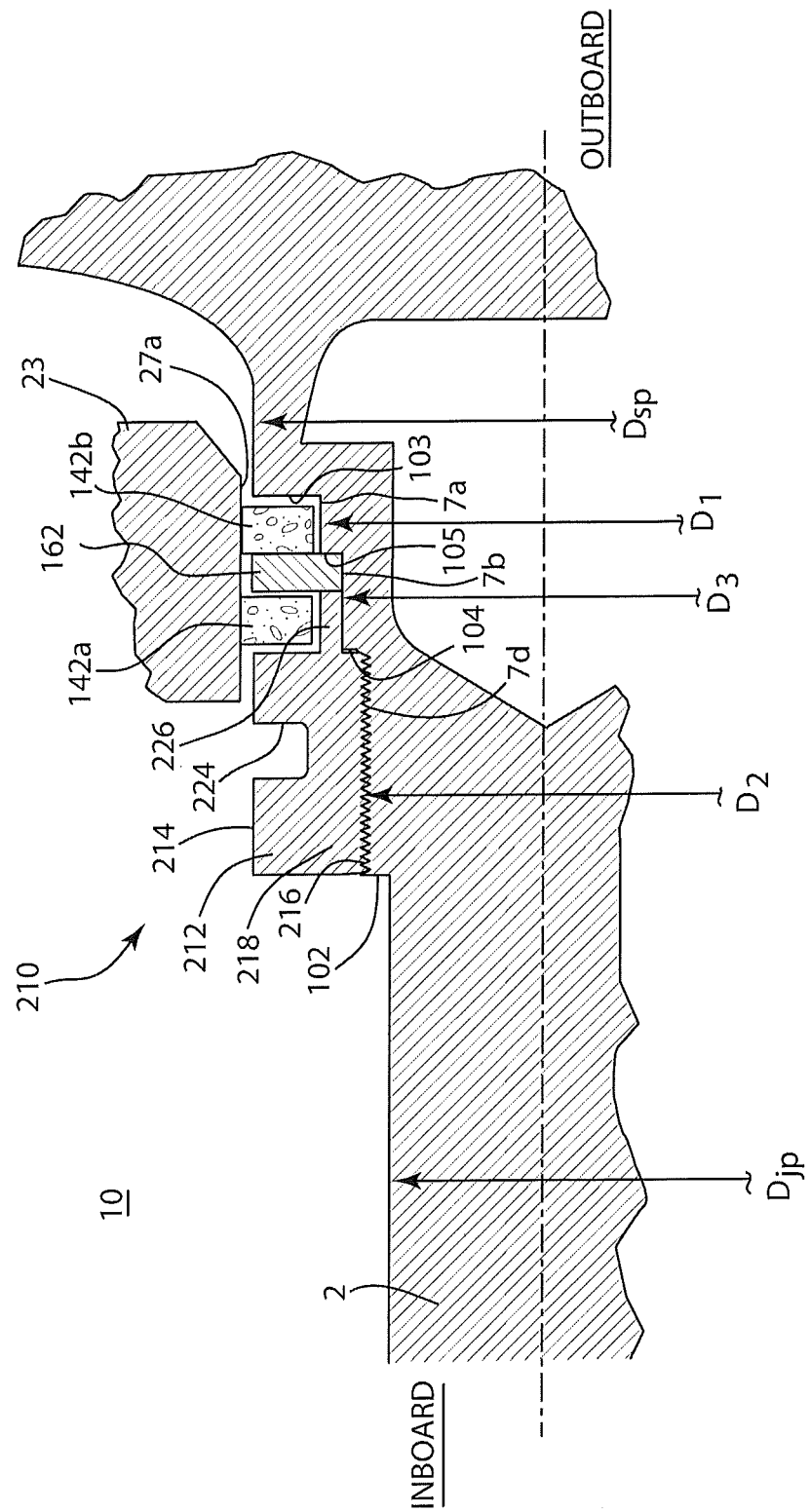
FIG. 4 is an enlarged cross sectional view of the turbine-end of the shaft illustrating a first embodiment of the modular seal assembly.

FIGS. 2 and 4 show a shoulder 104 between shaft diameter $D_2$ and $D_3$. In the embodiment shown in FIG. 2 the reduced shaft diameter $D_2$ and shoulder 104 are optional. In FIG. 4 the area of reduced shaft diameter $D_2$ is externally threaded and allows internally threaded retainer 212 to be screwed onto and secured to shaft 2.

The modular seal assembly 110 is assembled on the shaft 2 by sequentially axially sliding each element of the modular seal assembly 110 on shaft seal portion 7 as follows: First, the outboard ring seal 142b is slid along the shaft 2 until it resides in the first reduced diameter portion 7a adjacent the third shoulder 103. Then, the retainer ring 162, 162b is slid along the shaft 2 until it rests against shoulder 105. The inboard ring seal 142a is then slid along the shaft 2 from the stub portion 6 to the seal portion 7 until it rests against the inboard surface 182 of retainer ring 162, 162b. Finally, the retainer 112 is slid along the shaft 2 from the stub portion 6 to the seal portion 7 until it resides in the second reduced diameter portion 7c with the spacer abutting the retainer ring 162, 162b. The retainer 112 is press fit to the second reduced diameter portion 7c, whereby the inboard ring seal 142a is retained in the desired axial location between the retainer 112 and the retainer ring 162.

In FIG. 2, the inboard and outboard ring seals 142a, 142b are installed under radial compression, and when in place, the inboard and outboard ring seals 142a, 142b are interference fit to the ring bore 27a. As a result, the inboard and outboard ring seals 142a, 142b remain stationary during turbocharger operation. In addition, the labyrinth or clearance seal is formed between a first, stationary labyrinth surface defined by the ring bore 27a and the inboard and outboard ring seals 142a, 142b, and a second, rotating labyrinth surface defined by the retainer 112 and retainer ring 162 and the above-described surface features of the shaft seal portion 7.

The retainer 212 of the modular seal assembly shown in FIG. 4 is similar to the modular seal assembly 112 of FIG. 2, differs in that the radially inward facing surface 216 of the retainer 212 includes threads that are configured to engage corresponding threads formed on the outer surface of the second reduced diameter portion 7d. Thus, the retainer 212 is secured to the shaft 2 by the cooperative engagement of the respective threaded portions. In FIG. 4, elements 214, 218, 224, 226 correspond respectively to elements 114, 118, 124 and 126 of FIG. 2.

Introduction of the shaft, with modular seal components, into the bearing housing is facilitated by the beveled opening of the shaft bore as can be seen in FIGS. 1, 2 and 4.

While the shaft 2 has been described herein as being supported for rotation by a pair of radial bearings, it is contemplated, however, that the radial bearings used to rotatably support the shaft 2 can include, and are not limited to journal bearings and rolling element bearings (REBs) such as angular contact bearings, etc. When certain types of rolling element bearings are used, the thrust bearing assembly 24 can be omitted.

Although the modular seal assembly 110, 210 is described with respect to addressing turbine-end blow-by leakage, the seal assembly 110, 210 can be easily adapted for use on the compressor-end of the shaft 2 in order to address compressor-end blow-by leakage.

Aspects described herein can be embodied in other forms and combinations without departing from the spirit or essential attributes thereof. For instance, while embodiments described herein are directed to compressor end blow-by leakage, it will be appreciated that such sealing systems and methods can be applied to minimize turbine end oil discharge (i.e., the passage of oil from the bearing housing to the turbine stage). Thus, it will of course be understood that embodiments are not limited to the specific details described herein, which are given by way of example only, and that various modifications and alterations are possible within the scope of the following claims.

What is claimed is:

1. A turbocharger (10) comprising a sealing system (110, 210), the turbocharger (10) including
    a bearing housing (23) including an axial bore (27a);
    a shaft (2) having an axis of rotation, the shaft (2) rotatably supported in the axial bore (27a) and including at least a first shoulder (105) formed in an outer surface of the shaft between a first shaft diameter ($D_3$) and a second shaft diameter ($D_1$), and a second shoulder (103) formed on an outer surface of the shaft between the second shaft diameter ($D_1$) and a third shaft diameter ($D_{sp}$); and a turbine wheel (16) mounted on an end of the shaft (2), the sealing system (110, 120) including
an outboard ring seal (142b) disposed between the first and second shoulders (105, 103),
a retainer ring (162, 162b) that encircles the shaft (2) and abuts the first shoulder (105),
an inboard ring seal (142a) is disposed inboard of the retainer ring (162, 162b), and
a hollow cylindrical retainer (112, 212) secured to an outer surface of the shaft (2) inboard of the retainer ring (162, 162b),
wherein a spacer (126, 226) extending from the retainer (112, 212) to the retainer ring (162, 162b) or from the retainer ring (162, 162b) to the retainer (112, 212) spaces the retainer (112, 212) from the retainer ring (162, 162b) at a distance to receive the inboard ring seal (142a) between the retainer ring (162, 162b) and the retainer (112, 212) with close axial tolerance, and
wherein a labyrinth seal is formed by the inboard ring seal (142a), the outboard ring seal (142b), the retainer (112,212), the retainer ring (162,162b), and the second shoulder (103).

2. The turbocharger (10) of claim 1, wherein at least one of the outboard ring seal (142b) and the inboard ring seal (142a) are formed of a wear resistant material having a hardness of greater than 50 C in a Rockwell test.

3. The turbocharger (10) of claim 1, wherein at least one of the outboard ring seal (142b) and the inboard ring seal (142a) are formed of a sintered tool steel embedded with solid lubricants.

4. The turbocharger (10) of claim 1, wherein at least one of the outboard ring seal (142b) and the inboard ring seal (142a) are formed of a ceramic material.

5. The turbocharger (10) of claim 1, wherein the retainer (112) is press-fit to the outer surface of the shaft (2) inboard of the retainer ring (162,162b).

6. The turbocharger (10) of claim 1, wherein a radially inward-facing surface of the retainer (212) includes threads that engage with threads formed on the outer surface of the shaft (2) inboard of the retainer ring (162, 162b).

7. The turbocharger (10) of claim 1, wherein the outboard ring seal (142b) and the inboard ring seal (142a) are interference fit to the axial bore (27a).

8. The turbocharger (10) of claim 1, wherein the retainer ring (162) is interference fit to the axial bore (27a).

9. A method of assembling a modular sealing system on a shaft (2) of a turbocharger (10), the shaft having first (105) and second (103) shoulders bordering axial lengths of different diameter, the method comprising:
passing an outboard ring seal (142b) over the shaft and past the first shoulder (105) until it abuts the second shoulder (103) formed on the shaft (2);
passing a retainer ring (162, 162b) over the shaft until it abuts the first shoulder (105) formed on the shaft (2);
passing an inboard ring seal (142a) over the shaft until it abuts the retainer ring (162, 162b),
passing a retainer (112, 212) over the shaft and securing it to an outer surface of the shaft (2) inboard of the retainer ring (162, 162b),
wherein a spacer (126) extending from the retainer (112, 212) to the retainer ring (162, 162b) or from the retainer ring (162, 162b) to the retainer (112, 212) spaces the retainer (112, 212) from the retainer ring (162, 162b) at a distance to receive the inboard ring seal (142a) between the retainer ring (162, 162b) and the retainer (112, 212) with close axial tolerance, and
wherein a labyrinth seal is formed by the inboard ring seal (142a), the outboard ring seal (142b), the retainer (112,212), the retainer ring (162,162b), and the second shoulder (103).

\* \* \* \* \*